United States Patent [19]

Kobayashi

[11] 4,122,502
[45] Oct. 24, 1978

[54] PLAYBACK SYSTEM FOR A MAGNETIC TAPE RECORDER

[75] Inventor: Kozo Kobayashi, Kodaira, Japan

[73] Assignee: Nakamichi Research Inc., Kodaira, Japan

[21] Appl. No.: 774,141

[22] Filed: Mar. 3, 1977

[30] Foreign Application Priority Data

Mar. 5, 1976 [JP] Japan .................................. 51-23908

[51] Int. Cl.$^2$ .............................................. G11B 5/45
[52] U.S. Cl. ......................................... 360/65; 360/25
[58] Field of Search ..................................... 360/65, 25

[56] References Cited

U.S. PATENT DOCUMENTS

| | | | |
|---|---|---|---|
| 2,868,890 | 1/1959 | Camras | 360/65 |
| 3,568,174 | 3/1971 | Jacoby | 360/65 |
| 3,927,420 | 12/1975 | Hayashi et al. | 360/65 |
| 4,038,692 | 7/1977 | Umeda | 360/65 |

FOREIGN PATENT DOCUMENTS 2,502,980  7/1976  Fed. Rep. of Germany ............. 360/65

*Primary Examiner*—Jay P. Lucas
*Attorney, Agent, or Firm*—Wenderoth, Lind & Ponack

[57] ABSTRACT

This invention relates to a playback system for a magnetic tape recorder comprising an amplitude distortion corrector. It has an input versus output characteristic such that when the input level is less than the playback saturation level, which corresponds to the start of non-linear characteristics of the playback signal produced from a recorded signal at more than the recording saturation level due to a saturation of the magnetic tape, the output level is proportional to the input level. When the input level is more than the playback saturation level, the input verses output characteristics is complementary to the input versus output characteristic of the magnetic tape at corresponding signal levels. The playback system further comprises a high frequency emphasizer having an emphasizing circuit section having predetermined frequency characteristics disposed before the amplitude distortion corrector to emphasize predetermined frequencies in the playback signal so as to correct frequency dependent variations in the non-linear characteristics of the playback signal corresponding to a high level recorded signal which occurs due to saturation of the magnetic tape. The playback system further comprises a high frequency attenuator disposed after the amplitude distortion corrector and having frequency characteristic complementary to that of the high frequencies emphasizer so as to attenuate the frequency emphasized by the high frequency emphasizer.

4 Claims, 13 Drawing Figures

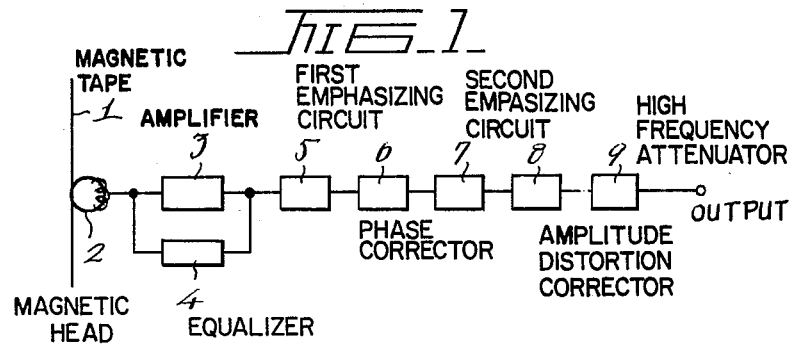
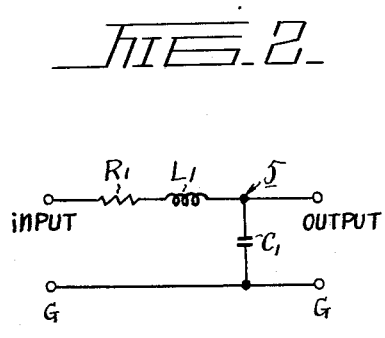
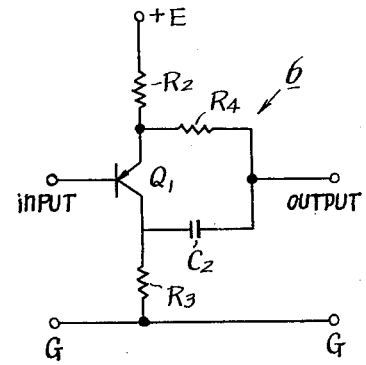
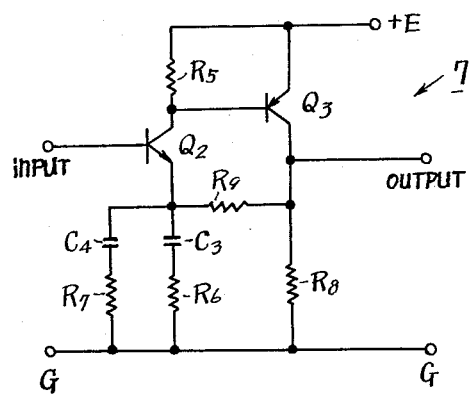
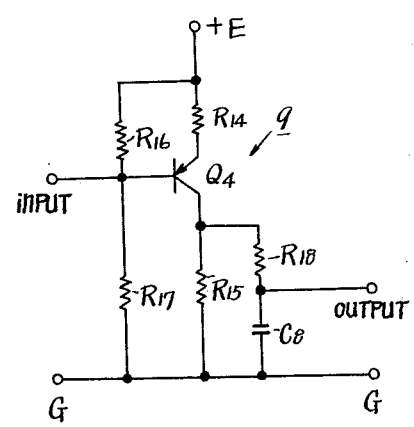

PLAYBACK SYSTEM FOR A MAGNETIC TAPE RECORDER

BACKGROUND OF THE INVENTION

In general, when a recorded signal on a magnetic tape is reproduced to generate a playback signal, the playback signal lacks higher harmonic components in case of a recorded signal of a distorted wave including higher harmonic components, due to various losses such as gap loss and core loss of the magnetic head, and loss due to the thickness of the magnetic tape and the space between the magnetic head and the magnetic tape. Thus, it is difficult to produce a playback output signal with the high fidelity of the recorded signal.

Especially, in case of a cassette type tape recorder wherein the magnetic tape is slowly fed and, therefore, a wave length of the recorded signal becomes substantially equal to the gap length of the playback head, it is difficult to fully correct such high frequency losses in the recording system. Also, high frequency losses which occur on reproducing the signal should be corrected in the playback system.

As the level of the recording signal becomes higher, the saturation of the magnetic tape occurs in a portion of the low frequency range and in the high frequency range at lower level than in the middle frequency range. This saturation is remarkable in the high frequency range. Accordingly, it is necessary to correct such high frequency losses upon reproducing the signal, but due to the resultant phase shift, it becomes more difficult to produce a playback signal waveform with fidelity to the recorded signal waveform.

In addition, the recorded signal of high level has a non-linear distortion at its peak due to the saturation of the magnetic tape. If the signal is recorded at lower level in order to avoid saturation of the magnetic tape, then it is difficult to produce playback signals of a desirable signal-to-noise ratio. Thus, it has been impossible to record and reproduce a distorted wave of high level with high fidelity.

SUMMARY OF THE INVENTION

Accordingly, it is a principal object of the present invention to provide a playback system for a magnetic tape recorder wherein a recorded signal of a high level and of a distorted wave can be reproduced with high fidelity.

It is another object of the present invention to provide a playback system for a magnetic tape recorder wherein a recorded signal having higher harmonic components can be reproduced with high fidelity.

It is further object of the present invention to provide a playback system for a magnetic tape recorder wherein the phase shift of a playback signal when it is frequency emphasized can be corrected.

It is further object of the present invention to provide a playback system for a magnetic tape recorder wherein various changes in the frequency characteristic, the phase characteristic and the amplitude characteristic of a reproduced signal caused by characteristics of the magnetic tape and the magnetic head can be fully corrected. Thus, it is suitable for reproducing a signal such as musical sound having a complicated waveform and including transient sharp peaks.

In accordance with the present invention, there is provided a playback system for a magnetic tape recorder comprising an amplitude distortion corrector having an input versus output characteristic such that when the input level is less than the playback saturation signal level, which is the start of non-linear characteristics of the playback signal produced from a recorded signal at more than the recording saturation level due to saturation of the magnetic tape, the output level is proportional to said input level, and when the input level is more than the playback saturation level, the output level is complementary to the output level of the magnetic tape at corresponding signal levels above the recording saturation level; a high frequency emphasizer having an emphasizing circuit section having predetermined frequency characteristics disposed before the amplitude distortion corrector to emphasize predetermined frequencies of the playback signal so as to correct frequency dependent variations in the non-linear characteristics of the high frequency losses on said playback signal corresponding to a high level recording signal which occurs due to saturation of the magnetic tape; and a high frequency attenuator disposed after the amplitude distortion corrector and having frequency characteristics complementary to that of said emphasizing circuit section so as to attenuate the frequencies emphasized by the high frequency emphasizer.

BRIEF DESCRIPTION OF THE DRAWINGS

The above and other features and objects of the invention will be apparent from the description of the embodiments taken with reference to the accompanying drawings in which;

FIG. 1 is a block diagram of an embodiment of a playback system of the present invention;

FIG. 2 is a schematic diagram of a first section of a high frequency emphasizer used in the playback system of FIG. 1;

FIG. 3 is a schematic diagram of a phase corrector used in the playback system of FIG. 1;

FIG. 4 is a schematic diagram of a second section of the high frequency emphasizer;

FIG. 6 is a schematic diagram of a high frequency attenuator used in the playback system of FIG. 1;

DETAILED DESCRIPTION OF THE EMBODIMENTS

Figure 5:
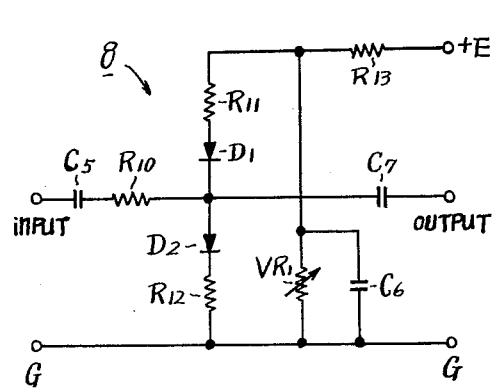
FIG. 5 is a schematic diagram of an amplitude distortion corrector used in the playback system of FIG. 1.

FIG. 1 shows an embodiment of a playback system of the present invention. A recorded signal on magnetic tape 1 is picked up by magnetic head 2, an output of which is supplied to amplifier 3. The amplifier 3 is coupled to an equalizer 4 to provide feedback of the output signal from the amplifier 3 to the input. The equalizer 4 has a frequency characteristic nearly in reverse proportion to the signal level needed to produce an output signal from the amplifier 3 having a constant level in spite of the frequency of the signal by correcting the output characteristics peculiar to the magnetic tape recorder so that the relative level of the playback signal becomes higher in proportion to its frequency due to integration of the signal of constant level on the magnetic tape 1. Thus, the equalizer 4 has an integral action in a conventional manner, and therefore a detailed description of the equalizer 4 has been omitted.

The output signal from the amplifier 3 is supplied to a high frequency emphasizer which includes a first emphasizing circuit section 5. The first emphasizing circuit section 5, as shown in FIG. 2, comprises a series connection of a resistor $R_1$ and an inductor $L_1$ and also comprises a capacitor $C_1$ connected between the output side of the inductor $L_1$ and a ground G. This first emphasizing circuit section 5 serves to correct high frequency losses including losses due to the gap length of the magnetic head 2, by means of the resonance of the inductor $L_1$ and the capacitor $C_1$. The resistor $R_1$ serves to determine the degree of correction.

A phase corrector 6 is supplied with the output signal from the first emphasizing circuit section 5 and serves to correct the phase shift of a signal due to the frequency characteristic of the first emphasizing circuit section 5. The phase corrector 6 also serves to correct the phase shift of a signal due to the frequency characteristic of a second emphasizing circuit section 7 of the high frequency emphasizer which will be described later.

The phase corrector 6 is shown in FIG. 3 in more detail. The output signal from the first emphasizing circuit section 5 is applied to a base of a transistor $Q_1$. The transistor $Q_1$ has an emitter connected through resistor $R_2$ to a power supply $+E$ and a collector connected through resistor $R_3$ to the ground G. An output signal taken from the emitter of the transistor $Q_1$ through a resistor $R_4$ and the output signal taken from the collector of the transistor $Q_1$ through a capacitor $C_2$ are added to each other and applied to the second emphasizing circuit section 7. The phase corrector 6 is substantially identical to a conventional phase shifter and serves to delay any phase having a signal of frequency higher than that determined by the value of the resistor $R_4$ and the capacitor $C_2$, having a greater delay as the frequency becomes higher. Thus, the advance in phase of the high frequency signal which occurs due to high frequency emphasis by the first and second emphasizing circuit sections 5 and 7 can be corrected so that the phase characteristic of the input signal to amplitude distortion corrector 8, which will be also described later, is close to the characteristic in which the phase of signal is in proportion to the frequency. If the values of the resistors $R_2$ and $R_3$ are equal to each other, there is no frequency dependent change in the amplitude of the signal, there is only a frequency dependent change in its phase.

The second emphasizing circuit section 7 of the high frequency emphasizer is supplied with the output signal from the phase corrector 6 and serves to correct losses which occur due to the saturation of the magnetic tape 1. This saturation is effected at lower levels as the frequency of the recorded signal becomes higher.

The details of the second emphasizing circuit section 7 is shown in FIG. 4. The output signal from the phase corrector 6 is applied to the base of transistor $Q_2$. The transistor $Q_2$ has the collector connected through resistor $R_5$ to the power supply $+E$ and has the emitter connected through series connection of capacitor $C_3$ and a resistor $R_6$ to the ground G. A series connection of capacitor $C_4$ and resistor $R_7$ is connected in parallel to the series connection of capacitor $C_3$ and resistor $R_6$. The capacitor $C_3$, which may have a relatively larger value, serves to cut off DC negative feedback from a rear stage circuit while the resistor $R_6$ is a negative feedback resistor for the transistor $Q_2$. The series connection of the capacitor $C_4$ and the resistor $R_7$ serves to provide negative feedback of the signal in response to its frequency so that when the frequency is more than a predetermined value, the degree of negative feedback becomes smaller as the frequency becomes higher, whereby the gain in the high frequency range can be larger. The collector of the transistor $Q_2$ is connected to the base of transistor $Q_3$ so as to amplify the signal. The transistor $Q_3$ has the emitter connected to the power supply $+E$ and has the collector connected through a resistor $R_8$ to the ground G. The collector of the transistor $Q_3$ is also connected through resistor $R_9$ to the emitter of the transistor $Q_2$ to form a negative feedback circuit whereby the proper degree of amplification is obtained.

Figure 7:
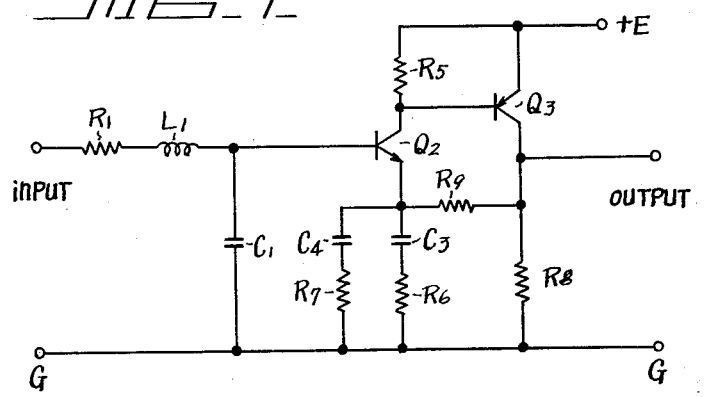
FIG. 7 is a schematic diagram of another form of the high frequency emphasizer used in the present invention.

Although the playback system of FIG. 1 includes high frequency emphasizer including the separate first and second emphasizing circuit sections 5 and 7 which are disposed on both sides of the phase corrector 6, the high frequency emphasizer may alternatively comprise first and second emphasizing circuit sections connected directly in series to each other as shown in FIG. 7.

The amplitude distortion corrector 8 is shown in FIG. 5. The output signal from the second emphasizing circuit section 7 is applied through a series connection of resistor $R_{10}$ and capacitor $C_5$ to the junction point of diodes $D_1$ and $D_2$ connected to each other in a forward manner. Resistors $R_{11}$ and $R_{12}$ are connected in series to the diodes $D_1$ and $D_2$, and the divided voltage produced by means of resistor $R_{13}$ and variable resistor $VR_1$, which divide the voltage of the power supply $+E$, is applied to this series connection of the diodes and the resistors. Thus, the diodes $D_1$ and $D_2$ have respective operating voltages applied thereacross. A capacitor $C_6$ which is connected in parallel to the variable resistor $VR_1$ serves to bypass the signal and the output signal is developed through a capacitor $C_7$.

When the level of the input signal is low, the diodes $D_1$ and $D_2$ are forward biased and conduct, and therefore, the input signal is divided by the composite value of the resistors $R_{11}$ and $R_{12}$ which are parallel to each other and this value of the resistor $R_{10}$ so that the divided signal is established across the output of the amplitude distortion corrector 8. When the level of the input signal becomes higher so that the peak value of the signal in the polarity of non-conductance of the diodes $D_1$ and $D_2$ exceeds their operating voltages, the diodes $D_1$ and $D_2$ become non-conductive and therefore the input signal is established across the output of the amplitude distortion corrector 8 without any attenuation. Thus, the level of the output signal becomes higher. It will be noted that when the level of the input signal is low, then the output signal has a level proportional to the input level, but when the level of the input signal exceeds the operating voltage of the diodes $D_1$ and $D_2$, which will be determined so that the operating voltage is equal to the signal level at which saturation of the magnetic tape begins, the output signal has a level reversely respondent to the level of the input signal centering around the linear line based on the input versus output characteristic when the input level is lower, which is shown at dotted lines in FIG. 8. Although two series connections of diode $D_1$ and resistor $R_{11}$ and diode $D_2$ and resistor $R_{12}$ are connected in series, alternatively more than two series connections may be connected in series in order to obtain any optimum operating voltage of the diodes.

High frequency attenuator 9 has frequency characteristics complementary to that of the second emphasizing circuit section 7, and the details of the attenuator 9 is shown in FIG. 6. The output signal from the amplitude distortion corrector 8 is applied through capacitor $C_7$ to the base of transistor $Q_4$. Transistor $Q_4$ has the emitter connected through resistor $R_{14}$ to the power supply $+E$ and has the collector connected through resistor $R_{15}$ to the ground G. A series connection of resistors $R_{16}$ and $R_{17}$ which is connected between the power supply $+E$ and the ground G has a junction point connected to base of the transistor $Q_4$ so that the base is given a bias potential. The impedance of the series connection of resistor $R_{18}$ and capacitor $C_8$ which is connected in parallel to resistor $R_{15}$ determines the frequency characteristics of attenuator 9 so that the frequency emphasized by the second emphasizing circuit section 7 is attenuated to the same degree as its emphasis. The output signal corrected in this manner is established across the capacitor $C_8$ which constitutes the output of attenuator 9.

Figure 8:
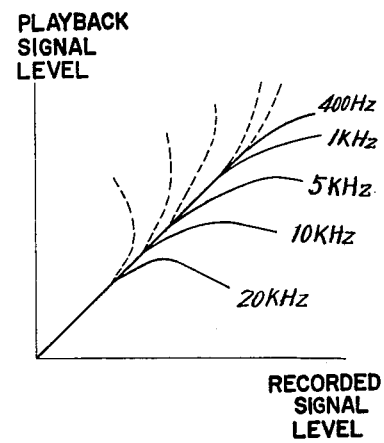
FIG. 8 illustrates the characteristics of the recording signal level versus the playback signal level.

With the arrangement of the playback system of the present invention, the recorded signal including higher harmonic components and distorted waves of high level which are affected by the saturation of the magnetic tape 1 can be reproduced with high fidelity. More particularly, the higher harmonic components of the playback signal which are included in the original recorded signal, but which are lost by losses such as the gap loss of the magnetic head 2 are corrected by the first emphasizing circuit section 5 while the resultant phase shift of the signal in the high frequency range is corrected by the phase corrector 6. Thus, the input signal has a phase characteristic in which the phase of the signal is approximately proportional to the frequency of the lower level signal and as a result the playback signal has a good fidelity to the recorded signal with respect to its frequency and phase characteristics. The amplitude distortion corrector 8 corrects the non-linear distortion of the playback signal corresponding to the recorded signal of high level which occurs due to the saturation characteristics of the magnetic tape 1. The non-linear distortion varies with the frequency of the signal. As shown in FIG. 8, as the frequency of the signal becomes higher, the output signal tends to be saturated at lower level, except for a portion of the low frequency range.

FIG. 8 illustrates the level of the playback output signal relative to the level of the recorded signal with a parameter of the frequency of the signal. As noted from FIG. 8, the playback output signal of approximately 400 Hz is saturated at the highest level, and as the frequency of the signal becomes higher, 1 KHz, 5 KHz, 10 KHz and 20 KHz, for example, the playback output signal is saturated at lower levels. Since the second emphasizing circuit section 7 amplifies the signal of these high frequencies so as to be in accord with the highest saturation level, the correction of the non-linear distortion at each of the frequencies by the amplitude distortion corrector 8 can be effected in a uniform manner. Thus, it will be noted that the second emphasizing circuit section 7 is essential to the operation of the amplitude distortion corrector 8. It will be also noted that the high frequency attenuator 9 is necessary for correcting the frequency characteristics of the output signal which are caused to be different from that of the recorded signal by the amplitude distortion corrector 8.

Figure 9A:
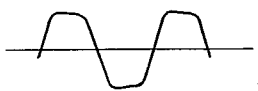
FIGS. 9A to 9E show the waveform of magnetic flux of the magnetic tape and the waveforms on the components of the playback system of the present invention.
Figure 9B:
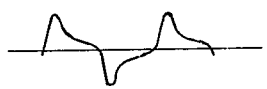
Figure 9C:
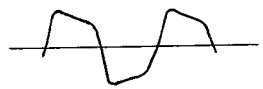
Figure 9D:
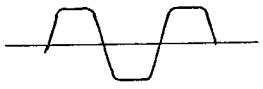
Figure 9E:
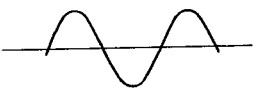

FIG. 9A shows the waveform of magnetic flux recorded on the magnetic tape 1 from a sine wave signal and FIG. 9B shows the waveform of the playback signal which is picked up at the magnetic head 2. If the playback signal is integrated, then it should have the waveform as shown in FIG. 9A, but it tends to have the waveform of FIG. 9C, which is caused by the phase shifts which the signal undergoes through the first and second emphasizing circuit sections 5 and 7. The phase corrector 6 corrects the deformation of the waveform of FIG. 9C to produce the waveform of FIG. 9D which is substantially identical to that of FIG. 9A. FIG. 9E shows the waveform of the output signal from the high frequency attenuator 9. It will be noted that this waveform is nearly a replica of the sine wave which was originally recorded on the magnetic tape 1.

While some preferred embodiments of the invention have been described and illustrated with reference to the accompanying drawings, it will be understood that they are by way of example, and that various changes and modifications may be made without departing from the spirit and scope of the invention. For example, if the lower frequency of the signal is required to be attenuated in accordance with the standards of the tape recorder, then a low frequency attenuator may be connected to the last stage of the playback system of FIG. 1. It should be understood that the invention is intended to be defined only by the appended claims.

What is claimed is:

1. A playback system for a magnetic tape recorder comprising a high frequency emphasizer means for receiving the playback signal having an emphasizing circuit section having predetermined frequency characteristics to emphasize predetermined frequencies in the playback signal; an amplitude distortion corrector receiving the output of said high frequency emphasizing means having an input versus output characteristic such that when the input level is less than the playback saturation signal level, which is the start of non-linear characteristics of the playback signal produced from a recorded signal at more than the recording saturation level due to saturation of the magnetic tape, the output level is proportional to the input level, and when the input level is more than the playback saturation level, the output level is complementary to the out level of the magnetic tape at corresponding signal levels above the recording saturation level for correcting the frequency dependent variations in the non-linear characteristics of the playback signal corresponding to a recorded signal of high level which occur due to saturation of the magnetic tape; and a high frequency attenuator receiving the output of said amplitude distortion corrector and having frequency characteristics complementary to that of said emphasizing circuit section of said high frequency emphasizer so as to attenuate the frequencies emphasized by said emphasizing circuit section of said high frequency emphasizer.

2. A playback system for a magnetic tape recorder as set forth in claim 1, wherein said high frequency emphasizer means further comprises a further emphasizing circuit section having predetermined frequency characteristics to emphasize the playback signal so as to correct high frequency looses including the gap loss of the magnetic head, and a phase corrector disposed preliminary to said amplitude distortion corrector and having phase characteristics in which the phase shift of the playback signal due to the frequency characteristics of said emphasizing circuit section and said further emphasizing circuit section is corrected to provide a phase characteristic of the input signal to said amplitude distortion corrector to approximate the characteristic in which the phase shift is proportional to the frequency of the input signal.

3. A playback system for a magnetic tape recorder as set forth in claim 2, wherein said emphasizing circuit section and said further emphasizing circuit section of said high frequency emphasizer are connected before and after said phase corrector, respectively.

4. A playback system for a magnetic tape recorded as set forth in claim 2, wherein said emphasizing circuit section and said further emphasizing circuit section are connected directly to each other, and disposed preliminary to said phase corrector.

* * * * *